United States Patent Office 3,658,940
Patented Apr. 25, 1972

3,658,940
SULPHONATED POLYMERS DERIVED
FROM POLYURETHANES
Jean Claude Galin, Strasbourg, France, assignor to
Societe Rhodiaceta, Paris, France
No Drawing. Filed Sept. 15, 1969, Ser. No. 858,116
Claims priority, application France, Sept. 17, 1968,
166,519
Int. Cl. C08g 41/04
U.S. Cl. 260—859                                   9 Claims

ABSTRACT OF THE DISCLOSURE

A sulphonated polymer having a good affinity for basic dyestuffs in the form of a plyurethane in which part of the hydrogen atoms attached to nitrogen have been replaced by units derived from propane sultone and optionally also acrylonitrile.

---

The invention relates to new sulphonated polymers derived from polyurethanes having a good affinity for basic dyestuffs and to a process for their preparation.

By the term "polyurethanes" is meant polymers having a plurality of units of the formula:

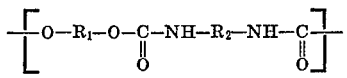

wherein $R_1$ and $R_2$ each represent divalent hydrocarbon or polyether radicals which may or may not be macromolecular.

It is known to improve the affinity of various natural or synthetic polymers for basic dyestuffs by attaching sulphonic side groups to their main chain. The treatment of polyamides in the fused state with a sultone is known. However such a process cannot be applied to polyurethanes because they are degraded extensively when heated to their melting point. It is also known to cyanoethylate some compounds containing different types of NH groups by reacting these compounds with acrylonitrile in the presence of an aqueous alkaline solution as catalyst. However in this process it is necessary to use a large excess of acrylonitrile compared with the amount to be attached.

The present invention provides a polymer which comprises a plurality of units of the formula:

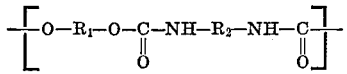

wherein $R_1$ and $R_2$ each represent a divalent hydrocarbon or polyether radical, at least a portion of the hydrogen atoms attached to the nitrogen atoms being replaced by radicals of the formula:

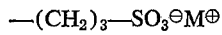
—(CH$_2$)$_3$—SO$_3$⊖M⊕ wherein M represents a hydrogen or an alkali metal atom, and optionally also by acrylonitrile radicals of the formula:

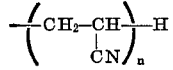

wherein $n$ is an integer equal to or greater than 1, and/or partially branched and/or cyclized polyacrylonitrile radicals, and the distribution of the units of the formula

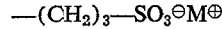
—(CH$_2$)$_3$—SO$_3$⊖M⊕ and the optional acrylonitrile and/or polyacrylonitrile units along the polymer chain is random.

For example, $R_1$ may be ethylene and $R_2$ may be a radical of the formula:

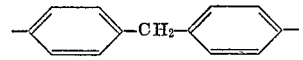

In general the polymers of this invention are such that 15 to 80% of the hydrogen atoms attached to the nitrogen atoms are replaced by radicals of the formula:

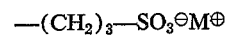
—(CH$_2$)$_3$—SO$_3$⊖M⊕

The polymers of this invention may be prepared by a process which comprises reacting in an inert atmosphere and in an aprotic solvent, a polyurethane having a plurality of units of the formula:

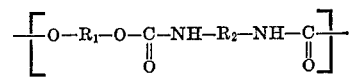

wherein $R_1$ and $R_2$ are as hereinbefore defined, with a metalating agent, reacting the product with 1,3-propane sultone and then optionally with acrylonitrile and then if desired converting the metal sulphonate groups to sulphonic acid groups.

Any metalating agent which is sufficiently stable in an aprotic medium, for example hydrides such as sodium hydride, radical-ions such as naphthalene sodium, carbanions such as n-butyl lithium, diphenylmethyl sodium, fluorenyl lithium or dimethylsulphinyl sodium, which can be optionally formed in situ can be used.

It is advantageous in choosing the metalating agent to take into account, first, the chemical nature of the groups $R_1$ and $R_2$ and, secondly, the chemical nature of the solvent medium employed. In this way, the combination of dimethylsulphinyl sodium/dimethylsulphoxide and of sodium hydride/dimethylformamide are found to be particularly valuable because in the majority of cases they enable quantitative metalation to take place, at ordinary temperature in the first case and at 0° C. and above in the latter case, without any chain degradation. The degree of metalation is fixed as desired and is determined only by the ratio metalating agent/polyurethane.

The treatment of the metalated groups with 1,3-propanesultone is carried out in an inert atmosphere using the reagent pure or dissolved in an aprotic solvent. For reasons of ease and hence of economy, it is generally preferred to carry out the process in the same solvent as is used during the metalation. In particular it is advantageous to carry out the treatment in dimethylformamide.

The reaction temperature may be 0° to 60° C. and is preferably about 50° C. and the treatment can last for only 15 to 30 minutes. The reaction is practically quantitative. The degree of sulphonation of the polymer may easily be controlled as desired by the two successive operations of metalation and of sulphonation. In particular, it is possible to sulphonate only a fraction of the metalated groups.

It is advantageous to cyanoethylate or graft anionically the sulphonated polymer by treating it with acrylonitrile in an aprotic medium, preferably in the same medium as was used for the metalation and sulphonation reactions. As before, it is advantageous to use dimethylformamide as the solvent. The reaction is initiated by the metalated groups remaining in the sulphonated polymer and no other catalyst needs to be added.

It is advantageous to carry out the process at as low a temperature as possible, for example at 0° C., as in general the lower the temperature the less coloured are the products.

The consumption of acrylonitrile is practically complete and the polyacrylonitrile content of the final product may be easily controlled as it only depends on the amount of acrylonitrile employed.

The products obtained possess alkali metal sulphonate groups which can optionally be converted into sulphonic acid groups, for example by passing the polymer solutions over an appropriately chosen ion exchange resin.

The process of this invention provides a method of preparing new products by a two or three step operation which can be carried out integrally in a single aprotic medium separation and subsequent redissolving of the intermediate products. Furthermore, the yields are very high, of the order of 90%.

The products of this invention are generally yellowish white or slightly coloured. Their properties and in particular their solubility vary according to the relative proportions of their various constituent units. They can be mixed with artificial or synthetic polymers such as secondary cellulose acetate, cellulose triacetate, polyacrylonitrile homopolymer, or a copolymer of acrylonitrile with methyl methacrylate or vinylidene chloride before they are shaped, to improve their hydrophilic character, their antistatic properties and their affinity for basic dyestuffs.

The following examples illustrate the invention.

EXAMPLE I

The polyurethane obtained by the reaction of ethylene glycol with 4,4′-diisocyanato-diphenylmethane of the formula:

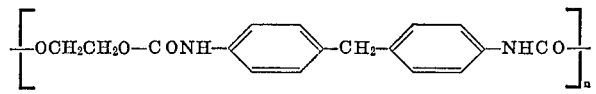

and intrinsic viscosity measured at 25° C. in dimethylformamide of 0.159 dl./g. is used.

6 g. of 50% sodium hydride in oil, previously washed with anhydrous tetrahydrofuran, are suspended with vigorous stirring in a solution of 31.2 g. of the polyurethane in 300 ml. of dimethylformamide cooled to 5° C. under an argon atmosphere. The temperature is allowed to rise slowly to ambient temperature and the stirring under an argon atmosphere is continued until the evolution of hydrogen ceases.

A sample is then taken from the reaction medium and the polymer precipitated by adding water acidified with hydrochloric acid. 2.5 g. of a polymer whose intrinsic viscosity and the infrared spectrum are identical to those of the starting polymer are recovered. Thus clearly showing that no degradation of the polymer chain has occurred.

15 g. of 1,3-propanesultone dissolved in 50 ml. of anhydrous dimethylformamide are slowly added to the solution of metalated polyurethane, with constant vigorous stirring and under an argon atmosphere. The temperature of the mixture is raised to 50° C. and the stirring is continued for 1 hour after all the 1,3-propanesultone has been added.

After acidification with dilute hydrochloric acid to a slightly acid pH, the reaction mixture is diluted with 150 ml. of methanol with vigorous stirring. The polymer is collected by slow precipitation with extremely vigorous stirring from its solution by addition to a large excess of acetone.

36 g. of a yellowish white polymer are thus obtained. Its average degree of sulphonation, determined from its sulphur content, is 58.9% of the initial-NH-groups, corresponding to a 98.15% sulphonation yield (as defined in Example 2). (Desired degree of sulphonation, 60%).

This polymer is soluble in water, dimethylformamide and dimethylsulphoxide.

EXAMPLES 2, 3 AND 4

The polyurethane used in Example 1 is treated by the method described in that example, but using different quantities of sodium hydride and 1,3-propanesultone.

The amounts of reagent used and the reaction yields are shown in Table I below.

TABLE I

| Example number | 2 | 3 | 4 |
|---|---|---|---|
| Polyurethane used (g.) | 28.2 | 28.7 | 31.2 |
| Degree of sulphonation desired | 20 | 40 | 80 |
| 50% sodium hydride in oil used (g.) | 1.8 | 3.7 | 8 |
| 1,3-propanesultone used (g.) | 5 | 10 | 20 |
| Sulphonated polymer obtained (g.) | 25.5 | 29.3 | 47.5 |
| Average degree of sulphonation obtained | 17.9 | 36.8 | 77.1 |
| Yield of the sulphonation | 89.6 | 91.9 | 96.4 |

Note.—In this table the degree of sulphonation is the number of sulphonated NH groups per 100 NH groups in the starting polymer; the yield of the sulphonation is equal to the ratio of the degree of sulphonation obtained to the degree of sulphonation desired×100.

The various polymers thus obtained are yellowish-white. The polymer obtained from Example 2 is insoluble in water but it dissolves easily in dimethylsulphoxide, dimethylformamide and N-methylpyrrolidone.

The polymers obtained from Examples 3 and 4 are soluble in water and dimethylsulphoxide. Their solubility in dimethylformamide decreases as the degree of sulphonation increases.

Solutions of various other polymers in dimethylsulphoxide are prepared and to each of these is added 5% by weight, based on the total weight of the mixture of polymers, of the polymer of Example 2. These solutions are cast to give films. The films obtained are homogeneous and display good properties. They are dyed with the dyestuff CI Basic Blue 71 (Colour Index, 2nd edition).

Table II below shows the percentages by weight of dyestuff fixed to these films in comparison with that fixed to reference films which do not contain the polymer of the invention. These percentages are expressed relative to the non-dyed films.

TABLE II

| Polymer | Percent of polymer obtained [1] | Percent of dyestuff fixed |
|---|---|---|
| Secondary cellulose acetate | 0 | 0.08 |
|  | 5 | 0.35 |
| Cellulose triacetate | 0 | 0.40 |
|  | 5 | 1.13 |
| Polyacrylonitrile homopolymer | 0 | 0.07 |
|  | 5 | 0.50 |
| Copolymer of acrylonitrile and methyl methacrylate (93.8/6.2) | 0 | 0.15 |
|  | 5 | 0.50 |
| Copolymer of acrylonitrile and vinylidene chloride, containing 64 milliequivalents of acid/kg. of polymer | 0 | 0.21 |
|  | 5 | 0.53 |

[1] According to Example 2 contained in the film.

EXAMPLE 5

In this example a polyurethane consisting of the same structural units as that used in Example 1 but having an intrinsic viscosity of 0.330 dl./g. measured at 25° C. in dimethylformamide is used. 31.2 g. of this polyurethane dissolved in 350 ml. of dimethylformamide are treated by the method described in Example 1, but using the following quantities of reagents: 50% sodium hydride in oil, 3.84 g.; 1,3-propanesultone 4.88 g.

When the reaction has finished, a sample is taken from the reaction medium and the polymer precipitated from it by addition to acetone acidified with dilute hydrochloric acid. 3 g. of sulphonated polyurethane having an average degree of sulphonation, determined from the sulphur content, of 19.4% of NH groups, corresponding to a yield of 97% for the sulphonation are recovered.

The reaction mixture is cooled to 5° C. and 17 g. of acrylonitrile are added slowly with vigorous stirring while the mixture is kept under an argon atmosphere. The stirring under an argon atmosphere at 5° C. is continued for 2 hours after all the acrylonitrile has been added. After acidifying the reaction medium in the cold with dilute hydrochloric acid, the polymer is recovered by slow precipitation with vigorous stirring by addition to a large excess of a mixture of equal volumes of isopropanol and diethyl ether. 49.5 g. of a yellowish white polymer containing 10.6% of nitrogen, representing 40.1% of combined acrylonitrile, and corresponding to a yield of 78.5% for the treatment with acrylonitrile, are collected.

This polymer is insoluble in water and soluble in dimethylsulphoxide, dimethylformamide, dimethylacetamide and N-methylpyrrolidone.

The polymer is mixed in the ratio of 5% by weight, based on the weight of mixture, with an acrylonitrile homopolymer. A 20% by weight solution of this mixture in dimethylformamide is clear and homogeneous. It can be cast to give a transparent film.

In the same way the polymer obtained in this example can be mixed with a copolymer based on acrylonitrile and vinylidene chloride and containing 64 milliequivalents of acid/kg. A 20% solution of this mixture in dimethylformamide is also clear and produces a transparent film on casting.

EXAMPLE 6

31.2 g. of the polyurethane used in Example 5, dissolved in 350 ml. of dimethylformamide, are treated by the method described in Example 1 but using the following quantities of reagents: 50% sodium hydride in oil, 2.88 g.; 1,3-propanesultone, 4.88 g.

By treating a sample as described in Example 5, 2.5 g. of sulphonated polyurethane are recovered. The average degree of sulphonation of this polyurethane, determined from the sulphur content, is 19% of the NH groups corresponding to a 95% yield for the sulphonation.

The reaction mixture is then treated with acrylonitrile as described in Example 5 but using 8.5 g. of acrylonitrile.

At the end of this operation, 41 g. of a yellowish white polymer, containing 10.1% of nitrogen, representing 38.2% of combined acrylonitrile, corresponding to a 90.9% yield for the treatment with acrylonitrile, are collected.

The polymer is insoluble in water and soluble in dimethylsulphoxide, dimethylformamide, dimethylacetamide and N-methylpyrrolidone. Like the polymer of Example 5, it shows good compatibility with acrylic and modified acrylic polymers.

I claim:

1. A polymer which comprises a plurality of units of the formula:

wherein a portion of the hydrogen atoms attached to the nitrogen atoms are replaced by radicals of the formula:

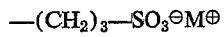

wherein M represents a hydrogen or an alkali metal atom, and a portion of said hydrogen atoms are replaced by acrylonitrile radicals of the formula:

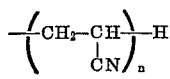

wherein $n$ is an integer equal to or greater than 1, and by polyacrylonitrile radicals, and the distribution of the units of the formula:

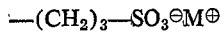

and the acrylonitrile and polyacrylonitrile units along the polymer chain is random.

2. A shaped article obtained from a solution of a polymer as claimed in claim 1.

3. A polymer according to claim 1 wherein 15 to 80% of the hydrogen atoms attached to the nitrogen atoms are replaced by radicals of the formula:

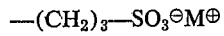

4. A process for preparing a polymer comprising a plurality of units of the formula:

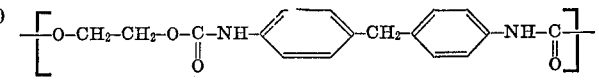

wherein a portion of the hydrogen atoms attached to the nitrogen atoms are being replaced by radicals of the formula:

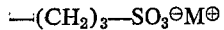

wherein M represents a hydrogen or an alkali metal atom, and a portion of said hydrogen atoms are replaced by acrylonitrile radicals of the formula:

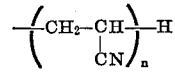

wherein $n$ is an integer equal to or greater than 1, and polyacrylonitrile radicals, and the distribution of the formula:

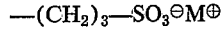

and the acrylonitrile and polyacrylonitrile units along the polymer chain is random, which process comprises reacting, in an inert atmosphere and in an aprotic solvent, a polyurethane having a plurality of units of the formula:

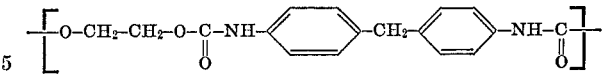

with a metalating agent, selected from the group consisting of alkali metal hydrides and alkali metal organometallic compounds reacting the product with 1,3-propane soltone and then with acrylonitrile.

5. A process according to claim 4 wherein the metal sulphonate groups are converted to sulphonic acid groups.

6. A process according to claim 4 wherein all the steps are performed in the same medium.

7. A process according to claim 4 which is carried out in homogeneous solution.

8. A process according to claim 4 wherein the metalating agent is sodium hydride.

9. A process according to claim 4 wherein the aprotic solvent is dimethylformamide.

References Cited

UNITED STATES PATENTS

| 2,879,248 | 3/1959 | Nischk et al. | 260—859 |
| 3,297,786 | 1/1967 | Horowitz | 260—859 |
| 3,461,103 | 8/1969 | Keberle et al. | 260—75 |
| 3,491,050 | 1/1970 | Keberle et al. | 260—29.2 |

FOREIGN PATENTS

| 2,249,563 | 10/1963 | Japan | 260—859 |

WILLIAM H. SHORT, Primary Examiner

E. A. NIELSEN, Assistant Examiner

U.S. Cl. X.R.

8—4, 115.5; 260—13 R, 29.6 NR, 32.6 N, 37 N, 465.4